June 24, 1924.                    A. B. SEVERN                    1,499,126
METHOD OF FORMING BEARING CAGES
Filed May 11, 1923
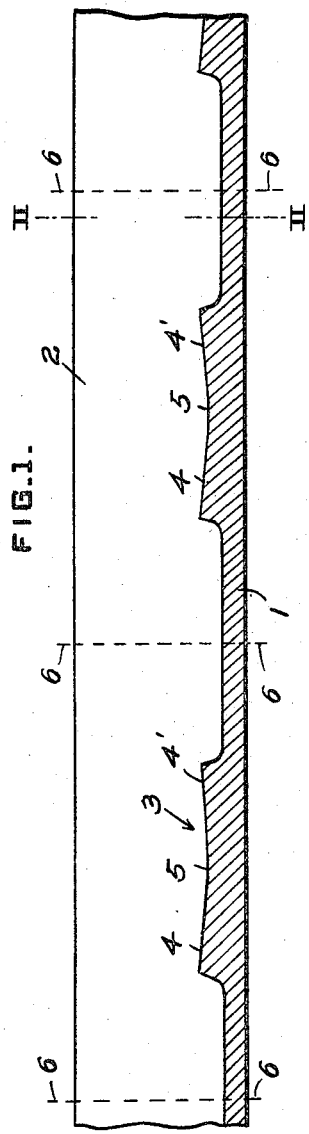
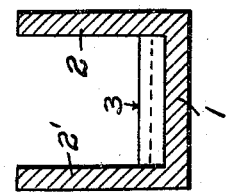
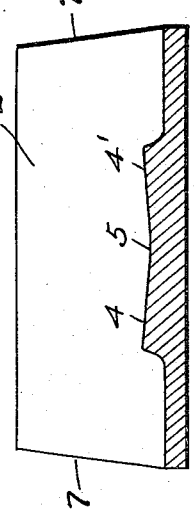
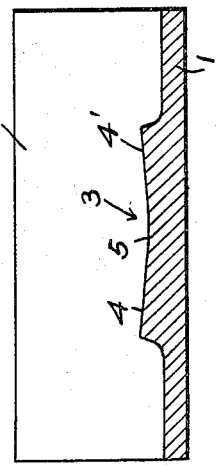
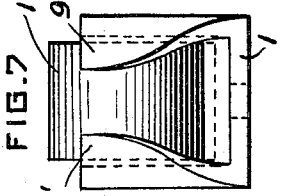
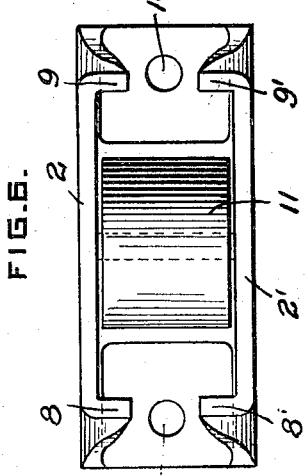
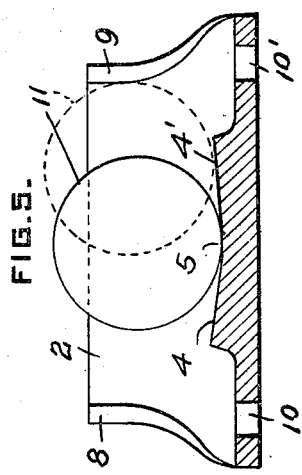
INVENTOR
Arthur B. Severn
By Winter & Brown
his attys Patented June 24, 1924.

1,499,126

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

METHOD OF FORMING BEARING CAGES.

Application filed May 11, 1923. Serial No. 638,187.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Methods of Forming Bearing Cages, of which the following is a specification.

This invention relates to a method of forming cages for roller side bearings for railway cars, or other similar purposes.

Heretofore it has been common practice to construct cages for roller side bearings by casting, or by more or less complicated forging operations, frequently necessitating the employment of several parts, and resulting in a composite structure. Many of these methods referred to are not only expensive and possess inherent difficulties, but the resulting product possesses objectionable features from a constructional view point.

It is an object of this invention to provide a method not only overcoming the objections noted but which will at the same time produce a highly desirable product which is extremely simple in construction and effective in operation.

It is a special object of the invention to provide a method whereby casting is entirely dispensed with, in which the entire bearing cage may be principally frabricated by a single rolling operation, and completed by a few simple subsequent forging operations, and in which the final result will be an integral structure of light weight and of great strength.

These and other objects of the invention will more fully appear when taken in conjunction with the following description and the appended claims.

In the accompanying drawings, Fig. 1 is a fragmentary sectional view showing a portion of the rolled channel with the bearing surfaces formed at spaced intervals upon the intermediate base or floor portion thereof; Fig. 2 is a transverse sectional view taken on the line II—II of Fig. 1; Fig. 3 a vertical sectional view of a single section of the rolled channel after the channel has been severed or cut into appropriate lengths; Fig. 4 a section such as shown in Fig. 3 after the ends of the sides have been tapered by removing a portion of the metal thereof; Fig. 5 a view similar to Figs. 3 and 5 showing the completed cage after the extremities of the side walls have been inwardly turned to provide end walls or limiting abutments; Fig. 6 a plan view of the completed cage with the cylindrical roller to be employed in connection therewith in centered position; and Fig. 7 an end elevation of the bearing illustrated in Fig. 6.

In practicing the present method, an open-ended U-shaped channel beam or member such as illustrated in Figs. 1 and 3 is first rolled. Although the blanks for the cage may be formed separately, preferably a channel beam is rolled in comparatively long lengths (see Fig. 1) by any of the well known processes of producing such articles as by means of suitable grooved cooperating rolls. The beam or channel member comprises an intermediate base or floor portion 1 and the lateral side portions 2, 2′, extending angularly with respect to the base or floor 1. The sides preferably extend at substantially right angles to the floor, as clearly shown in Fig. 2. The interior face of the intermediate base or floor portion 1 is provided at spaced intervals thereon with specially formed bearing surfaces such as indicated generally at 3, the distance at which these bearing surfaces are separated depending upon the dimensions and character of the finished cage desired. Preferably the bearing surfaces 3 are formed by thickening the base or floor 1 with the opposite extremities 4, 4′, thereof sloping towards an intermediate flat portion 5.

The rolled beam, if rolled in long lengths, as indicated in Fig. 1, is then cut into appropriate sections by severing in any suitable manner, as by sawing, at the points 6 intermediate the several bearing surfaces 3. One of the severed sections is illustrated in Fig. 3 and consists of an open-ended channel section corresponding in cross section to the beam illustrated in Figs. 1 and 2 and is equipped with the specially formed bearing surface 3 at a point substantially midway between its open ends. After the beam has been subdivided into the channel sections illustrated in Fig. 3, the edges at the extremities of the sides are tapered by removing a portion of the metal, being forced to assume a shape aproximately that illustrated in Fig. 4, the tapered edges at the extremities of the sides being indicated at 7, 7'. The extremities of the opposite sides of the channel section are then turned inwardly by bending the upper corners of the opposite sides towards each other so as to form the limiting abutments 8, 8' and 9, 9', as clearly shown in Figs. 5 to 7. In carrying out this step of the process, the contiguous ends of the opposite sides are turned inwardly and transversely of the channel section but to an extent less than half the width of the channel, consequently leaving an open space between the abutments 8, 8' as well as between the abutments 9, 9'. It is also noted that the abutments on the opposite sides at contiguous ends of the cage are disposed in alignment whereby the pairs of abutments form effective end walls for the cage. If desired, the cage thus completed, may be provided with attaching apertures 10, 10' by punching in any well known manner, these apertures providing means for fastening the cage in operative position by securing devices such as rivets or bolts commonly used for this purpose.

Although the process preferably includes the tapering of the ends of the side walls, as previously described and illustrated in Fig. 4, this step may be dispensed with, if desired, in which case an open-ended channel section such as illustrated in Fig. 3 may be directly converted into a finished cage by merely turning inwardly or bending the outer corners of the extremities of the two side portions to form limiting abutments or end walls similar to those illustrated in Figs. 5 to 7.

It is also noted that the form of special bearing surface 3 illustrated is merely the type preferred. Many forms of bearing surfaces may be adopted without departing from the spirit of the invention, and in the event that a plain flat bearing surface is desired, the base or floor portion is made of uniform thickness throughout its entire extent. Instead of forming the special bearing surfaces 3 by thickening the metal of the base at spaced intervals, as previously described, it is obvious that bearing surfaces having a similar contour may be formed by a reduction in the thickness of the metal at suitably spaced intervals.

The present process does not include the formation of the roller which is indicated at 11 in Figs. 5 to 7. A showing of the roller in operative position within the finished cage has been included in the drawings in order to more clearly set forth the nature of the product produced and the significance of the several steps of the process for forming the cage.

It is thus seen that the invention provides a method of forming cages for roller side bearings which entirely eliminates the necessity of casting or other complicated and expensive forging operations, comprising a minimum number of steps, and produces a product which is simple in construction and effective in operation and one which is an integral structure of light weight and of extreme strength.

I claim:

1. The method of forming cages for roller side bearings which consists in rolling channel sections having an intermediate portion and side portions disposed angularly thereto, and subsequently turning inwardly the extremities of the side portions to form limiting abutments.

2. The method of forming cages for roller side bearings which consists in rolling channel sections substantially U-shaped in cross section, and subsequently bending inwardly the upper extremities of the sides of the channel to form limiting abutments.

3. The method of forming cages for roller side bearings which consists in rolling open-ended channel sections substantially U-shaped in cross section, and subsequently bending the extremities of the opposite sides inwardly towards each other and transversely of the open ends to form limiting abutments.

4. The method of forming cages for roller side bearings which consists in rolling open-ended channel sections substantially U-shaped in cross section, and subsequently bending the upper corners of the extremities of the sides inwardly to form limiting abutments.

5. The method of forming cages for roller side bearings which consists in rolling an open-ended U-shaped channel section the intermediate portion of which is shaped to provide a bearing surface and the sides of which extend vertically to provide side walls, and turning the extremities of said sides inwardly for a distance less than half the width of said intermediate portion, whereby to form end walls, but leaving an open space between the inturned parts at contiguous ends of the opposite sides.

6. The method of forming cages for roller side bearings which consists in rolling open-ended U-shaped channel sections, removing portions at the ends of the sides thereby to taper the same, and subsequently turning the upper corners of the sides inwardly to form end walls.

7. The method of forming cages for roller side bearings which consists in rolling continuous lengths of channel beams substantially U-shaped in cross section and having spaced bearing surfaces formed on the intermediate or floor portion of the channel, severing the said channel intermediate the bearing surfaces to form sections and bending inwardly the extremities of the sides of the sections to form end walls.

8. The method of forming cages for roller side bearings which consists in rolling continuous lengths of channel beams substantially U-shaped in cross section and having spaced bearing surfaces formed on the intermediate or floor portion of the channel, severing the said channel intermediate the bearing surfaces to form sections, removing a portion of the metal at the ends of the sides of each section to taper the same, and bending inwardly the outer corners at the extremities of the sides of the sections to form end walls.

9. The method of forming cages for roller side bearings which consists in bending inwardly the extremities of the side walls of a rolled channel member having an intermediate base or floor portion providing a bearing surface and side portions projecting angularly thereto, whereby to form limiting end walls for the cage.

10. The method of forming cages for roller side bearings which consists in bending inwardly the extremities of the side walls of an open-ended rolled channel member the inner face of the floor or base of which is equipped with portions inclined towards an intermediate portion, all of said portions providing a bearing surface, and side walls projecting substantially at right angles to the said floor or base whereby to form limiting end walls for the cage.

In testimony whereof, I sign my name.

ARTHUR B. SEVERN.

Witness:
EDWIN O. JOHNS.